United States Patent [19]

Bourson et al.

[11] Patent Number: 5,449,436
[45] Date of Patent: * Sep. 12, 1995

[54] BLEACHING OF DEINKED PAPER/WOOD PULP

[75] Inventors: Lucien Bourson, Bois-Colombes; Michel Devic, Sainte-Foy les Lyons, both of France

[73] Assignee: Atochem, Puteaux, France

[*] Notice: The portion of the term of this patent subsequent to Sep. 1, 2009 has been disclaimed.

[21] Appl. No.: 26,215

[22] Filed: Mar. 1, 1993

Related U.S. Application Data

[63] Continuation of Ser. No. 859,260, Mar. 26, 1992, abandoned, which is a continuation of Ser. No. 770,723, Oct. 4, 1991, abandoned, which is a continuation of Ser. No. 639,361, Jan. 10, 1991, abandoned, which is a continuation of Ser. No. 440,785, Nov. 24, 1989, abandoned.

[30] Foreign Application Priority Data

Nov. 24, 1988 [FR] France ................................ 88 15637

[51] Int. Cl.$^6$ .......................... D21C 9/10; D21C 9/16
[52] U.S. Cl. ............................................ 162/6; 162/7; 162/78; 162/84
[58] Field of Search ...................... 162/6, 7, 78, 83, 84

[56] References Cited

U.S. PATENT DOCUMENTS

| 3,384,534 | 5/1968 | Kindron et al. | 162/71 |
| 3,981,765 | 9/1976 | Kruger et al. | 162/80 |
| 3,985,674 | 10/1976 | Ellis et al. | 162/83 |
| 4,812,206 | 3/1989 | Devic et al. | 162/86 |
| 5,143,581 | 9/1992 | Devic | 162/78 |

FOREIGN PATENT DOCUMENTS

| 656601 | 1/1965 | Belgium . |
| 1546250 | 8/1970 | Germany . |
| 2105324 | 2/1971 | Germany . |

*Primary Examiner*—Geoffrey L. Knable
*Attorney, Agent, or Firm*—Burns, Doane, Swecker & Mathis

[57] ABSTRACT

Deinked paper/wood pulps are improvedly bleached to high levels of whiteness by conjointly treating such pulps with a sulfite bleaching agent, e.g., $Na_2SO_3$, $NaHSO_3$ or mixture thereof, or $SO_2$ and NaOH, and a reducing agent more electronegative than the sulfite ion, e.g., thiourea dioxide, sodium borohydride or sodium dithionite, in a reaction medium having an initial pH ranging from 6 to 12, advantageously followed by washing sulfite and reducing agent values from the bleached pulp and then treating the washed pulp with hydrogen peroxide in an aqueous alkaline medium.

6 Claims, No Drawings

BLEACHING OF DEINKED PAPER/WOOD PULP

This application is a continuation of application Ser. No. 07/859,260, filed Mar. 26, 1992, now abandoned, which is a continuation of application Ser. No. 07/770,723, filed Oct. 4, 1991, now abandoned, which is a continuation of application Ser. No. 07/639,361, filed Jan. 10, 1991, now abandoned, which is a continuation of application Ser. No. 07/440,785, filed Nov. 24, 1989, now abandoned.

BACKGROUND OF THE INVENTION

1. Field of the Invention

The present invention relates to the bleaching of deinked paper/wood pulps, and, more especially, to the bleaching of such pulps by conjointly treating same with a sulfite bleaching agent in conjunction with a particular reducing agent.

2. Description of the Prior Art

The use of bleached pulp obtained from recycled and deinked paper has become increasingly important in the paper industry, for example for the production of printing or toilet paper, or cardboard. See in this regard the text by R. P. Singh, The Bleaching of Pulp, 3rd. Ed., 324–326, 560–562.

The bleaching of deinked pulp entails use of a reducing agent, such as, for example, sodium hydrosulfite or sodium dithionite, or an oxidizing agent, such as, for example, hydrogen peroxide. Compare DE 3,118,192.

This '192 patent application describes the introduction, in the initial phase of deinking, of a reducing bleaching agent which may be a mixture of sulfite and dithionite, in a proportion of 0.1% to 2% by weight relative to the paper in the dry state, at a pH ranging from 9.5 to 12.

Dithionite, on the other hand, is applied to the deinked pulp at a pH equal to 6, a value that differs from the pH of the deinking operation and which must independently be established.

SUMMARY OF THE INVENTION

Accordingly, a major object of the present invention is the provision of a novel process for the bleaching of deinked pulp utilizing a mixture of sulfite and a reducing agent similar to sodium dithionite but which is more electronegative than the sulfite ion, $SO_3-$, at a pH ranging from 6 to 12.

By the term "sulfite" as utilized herein is intended sodium sulfite, $Na_2SO_3$, or sodium bisulfite, $NaHSO_3$, or sodium sulfite and sodium bisulfite, or, more generally, sulfur dioxide, $SO_2$, plus sodium hydroxide.

DETAILED DESCRIPTION OF THE PREFERRED EMBODIMENTS OF INVENTION

More particularly according to the present invention, it has now been determined that the subject novel bleaching process is advantageously combined with a bleaching stage employing hydrogen peroxide, in an aqueous alkaline medium.

Most generally, the present invention features a process for the bleaching of deinked pulp, such bleaching being carried out by the combined action of sulfite and a reducing agent more electronegative than the sulfite ion, in a medium initially having a pH ranging from 6 to 12.

The reducing agent that is more electronegative than the sulfite ion, hereinafter designated the "reducing agent" is advantageously selected from among thiourea dioxide or formamidinesulfinic acid, sodium borohydride and sodium hydrosulfite.

Compare in this regard the thesis by Odile Chalmin Louis-Andre, submitted Dec. 6, 1985, Claude-Bernard-Lyon-1 University: "Reducing Properties of Sodium Dithionite Under Phase Transfer Conditions" which evaluates the electronegativity of sodium dithionite and thiourea dioxide.

The amount of reducing agent employed may vary in accordance with its nature. It generally ranges from 0.1% to 5% in the case of thiourea dioxide or dithionite. Such amount, and all amounts specified hereinafter, is expressed in terms of percent by weight relative to the weight of the deinked pulp in the dry state (unless indicated otherwise). Sodium borohydride is used in proportions of approximately 0.01% to 0.5%, typically ranging from 0.05% to 0.25%. The reducing agent is conveniently employed in the form of an aqueous solution thereof, such as, for example, the solution containing 12% by weight of sodium borohydride marketed under the trademark BOROL ® by the Ventron Corporation.

The amount of sulfite employed, expressed as sulfur dioxide $SO_2$, ranges from approximately 0.1% to 10%, most typically from 1% to 6%.

The quantity of sulfite, either that of sodium sulfite $Na_2SO_3$ or sodium bisulfite $NaHSO_3$, or sodium sulfite together with sodium bisulfite, or sulfur dioxide with sodium hydroxide, respectively, is preferably greater than 2%.

In the process of the invention, the sulfite and the reducing agent are never in contact, one without the other, with the pulp and the initial pH of the medium comprising both, together with the pulp, is within the above range. For example, if the process of the invention begins with an impregnation of the pulp, the aqueous solution contains both the required sulfite and reducing agent.

A principal advantage of the process of the invention is that it provides favorable results at pH values at which the combined action of the sulfite and the reducing agent is carried out, such pH values being within the wide limits of the initial pH range. This pH is preferably equal to at least about 7.

The temperature at which the sulfite and the reducing agent coact with the deinked pulp advantageously ranges from approximately 40° to 100° C., preferably from 65° to 95° C.

The consistency, the percentage by weight of the deinked pulp in the medium in the dry state, is not a critical factor according to the invention. In actual practice, it may range from about 5% to 50%, most typically from approximately 5% to 25%.

The duration of the combined action of the sulfite and the reducing agent according to the invention depends on the other parameters of the process. Most typically it does not exceed 2 hours.

This invention also features a process for the bleaching of deinked pulps, wherein the bleaching is carried out by the conjoint action of the sulfite and a reducing agent that is more electronegative than the sulfite ion (as described above), followed by a washing of the pulp obtained in this manner to better eliminate the ions of the sulfite and the reducing agent, and by contacting the washed pulp with hydrogen peroxide in an aqueous alkaline medium.

High levels of whiteness are provided in this manner.

The washing is carried out in known manner, for example in a sequence, whether singly or repeated, of the dilution of the pulp with water and reconcentration by compression or filtering.

The importance of such washing step is noted, for example, in the article by H. Kruger and H. U. Suss, *Tappi*, pp. 143-148, 1982 International Sulfite Pulping Conference, Toronto (Oct. 20-22, 1982).

The bleaching by means of hydrogen peroxide is carried out, for example, using an amount of hydrogen peroxide ranging from approximately 0.5% to 10%, preferably from 2% to 6%, in the presence of about 1% to 6% of a 10% to 30% solution of sodium silicate having a density of 1.33, at a pH ranging from approximately 9 to 11, at a temperature ranging from 40° to 100° C., for approximately 0.5 to 2 hours. The bleaching solution may contain such additives as one or more complexing or sequestering agents, for example the sodium salts of diethylenetriaminepentaacetic acid and ethylenediaminetetraacetic acid, in amounts generally ranging from about 0.1% to 1%. The pulp to be treated with the hydrogen peroxide may be subjected prior to the action of the hydrogen peroxide, to a treatment with a 5% to 30% formulation of the aforementioned complexing or sequestering agents in the specified amounts, at a temperature ranging from 20° to 100° C., preferably ranging from 50° to 100° C., even more preferably ranging from 50° to 95° C., such that it will not be necessary to conduct the operation under pressure, while maintaining a sufficiently rapid complexing or sequestering action, for periods of time ranging from approximately 5 min to 2 hours, preferably followed by washing, for example by means of compression.

The treatment of the deinked pulp simultaneously with the sulfite and a reducing agent may itself be preceded by a treatment of the pulp with a complexing or sequestering agent of the aforedescribed type. Its consistency may then range from 5% to 50%, typically from 25% to 30%. Such a treatment serves to further enhance the intrinsic effects of the invention relative to the degree of whiteness after bleaching and the effectiveness of the action of the hydrogen peroxide.

It is also possible to contact the deinked pulp to be bleached with the complexing or sequestering agent at the very moment of the treatment with the sulfite and the reducing agent.

In order to further illustrate the present invention and the advantages thereof, the following specific examples are given, it being understood that same are intended only as illustrative and in nowise limitative.

In said examples to follow:
(i) the amounts are expressed in percentage by weight relative to the deinked pulp in the dry state, except as otherwise indicated;
(ii) DTPA designates an aqueous 40% by weight solution of the sodium salt of diethylenetriaminepentaacetic acid, in the amount indicated;
(iii) the initial pH of the medium of the conjoint action of the sulfite and the reducing agent, and, if such be the case, that of the aqueous solution of the preliminary impregnation of the pulp, ranged from 6 to 12;
(iv) the sodium borohydride was BOROL ®, in the amount indicated;
(v) silicate designates an aqueous solution of sodium silicate having a density of 1.33;
(vi) the degree of whiteness, expressed in degrees, was measured (457 nm) using a spectrophotometer of the ELREPHO type, marketed by Carl Zeiss; and (vii) the starting material deinked pulp had a degree of whiteness of 61.5°.

EXAMPLES 1 To 5:

The deinked pulp, having a consistency of 12%, was subjected to the combined action of BOROL ® sodium sulfite plus sodium bisulfite, at a temperature of 90° C. for 1 hour.

The Table reports the experimental conditions relative to the respective amounts of BOROL ®, sodium bisulfite, the initial pH and the degree of whiteness of the resulting bleached pulps.

TABLE

| Example | Sulfite $Na_2SO_3$ | $NaHSO_3$ | BOROL ® | pH | Degree of whiteness |
|---|---|---|---|---|---|
| 1 | 2.1 | 4 | 1 | 7 | 69.5 |
| 2 | 6.5 | 0.35 | 1 | 10.5 | 67.5 |
| 3 | 3.2 | 3.2 | 1.8 | 8.2 | 71 |
| 4 | 3.2 | 3.2 | 2 | 8.4 | 71.6 |
| 5 | 3.2 | 3.2 | 0.45 | 6.9 | 67.5 |

EXAMPLES 6 And 7:

The deinked pulps (having a consistency of 12%) obtained in Examples 2 and 3 were treated, once the sulfite and borohydride ions were eliminated by washing, with 4% hydrogen peroxide containing 0.8% sodium hydroxide and 0.5% DTPA, at 70° C. and for 2 hours.

The thus bleached pulp of Example 3 had a degree of whiteness of 75.1° (Example 6).

The thus bleached pulp of Example 2 had a degree of whiteness of 72.6° (Example 7).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the bleaching of deinked paper pulp, comprising simultaneously adding to a deinked pulp a sulfite bleaching agent and a reducing agent comprising sodium borohydride to conjointly treat such pulp in a reaction medium having an initial pH ranging from at least 7 to 12, washing the conjointly treated pulp to eliminate said sulfite bleaching agent and sodium borohydride therefrom, and then treating such washed pulp with hydrogen peroxide, in an aqueous alkaline medium.

2. The process as defined by claim 1, said sulfite bleaching agent comprising sodium sulfite, sodium bisulfite, mixture of sodium sulfite and sodium bisulfite, or sulfur dioxide together with sodium hydroxide.

3. The process as defined by claim 1, said reducing agent comprising sodium borohydride, employed in an amount ranging from 0.01% to 0.5 % by weight relative to the dry weight of the deinked pulp.

4. The process as defined by claim 1, wherein said sulfite bleaching agent is employed in an amount ranging from 0.1% to 10 % by weight, expressed as sulfur dioxide, relative to the dry weight of the deinked pulp.

5. The process as defined by claim 4, wherein said amount of sulfite bleaching agent is at least 2 % by weight.

6. The process as defined by claim 1, carried out at a temperature ranging from 40° to 100° C.

* * * * *